US008923119B2

(12) United States Patent
Ogura

(10) Patent No.: US 8,923,119 B2
(45) Date of Patent: Dec. 30, 2014

(54) COMMUNICATION APPARATUS AND COMMUNICATION CONTROL METHOD

(75) Inventor: Daisuke Ogura, Tokyo (JP)

(73) Assignee: NEC Corporation, Tokyo (JP)

(*) Notice: Subject to any disclaimer, the term of this patent is extended or adjusted under 35 U.S.C. 154(b) by 79 days.

(21) Appl. No.: 13/319,242

(22) PCT Filed: Apr. 16, 2010

(86) PCT No.: PCT/JP2010/002776
§ 371 (c)(1),
(2), (4) Date: Nov. 7, 2011

(87) PCT Pub. No.: WO2010/131419
PCT Pub. Date: Nov. 18, 2010

(65) Prior Publication Data
US 2012/0051222 A1    Mar. 1, 2012

(30) Foreign Application Priority Data

May 11, 2009  (JP) ............................... P2009-114576

(51) Int. Cl.
*H04J 1/16*     (2006.01)
*H04L 29/06*    (2006.01)
*H04L 12/851*   (2013.01)

(52) U.S. Cl.
CPC ............. *H04L 65/80* (2013.01); *H04L 47/245* (2013.01)
USPC ........... 370/230; 370/235; 370/252; 709/231; 709/233

(58) Field of Classification Search
USPC .............. 370/230, 230.1, 235, 252, 310, 390; 709/231, 233, 228
See application file for complete search history.

(56) References Cited

U.S. PATENT DOCUMENTS

| 5,774,453 A | 6/1998 | Fukano et al. |
| 2001/0048662 A1 | 12/2001 | Suzuki et al. |

(Continued)

FOREIGN PATENT DOCUMENTS

| JP | 2001345847 A | 12/2001 |
| JP | 2006101428 A | 4/2006 |

OTHER PUBLICATIONS

International Search Report for PCT/JP2010/002776 mailed May 18, 2010.

(Continued)

*Primary Examiner* — Awet Haile
(74) *Attorney, Agent, or Firm* — Sughrue Mion, PLLC

(57) ABSTRACT

A communication apparatus and a communication control method are provided that can transmit a high-priority stream and interrupt a transmission of a low-priority stream when a network is busy, and control the transmissions of streams for each stream. The communication apparatus determines whether or not a congestion degree of communication with a communication destination apparatus has exceeded a predetermined determination value, transmits a plurality of streams to the communication destination apparatus in parallel under a situation in which the congestion degree does not exceed the determination value, and thereafter interrupts at least a transmission of a stream having priority lower than other streams among the plurality of streams transmitted in parallel if the congestion degree exceeds the determination value, the priority of each stream being indicated by priority information.

9 Claims, 4 Drawing Sheets

(56) References Cited

U.S. PATENT DOCUMENTS

2007/0076604 A1* 4/2007 Litwack .................. 370/230
2008/0084826 A1* 4/2008 Ong ........................ 370/237
2008/0205445 A1* 8/2008 Kumar et al. ............ 370/469
2009/0296581 A1* 12/2009 Mekkattuparamban
 et al. ...................... 370/235
2011/0255403 A1* 10/2011 Papirakis ................ 370/230.1
2012/0057511 A1* 3/2012 Sivakumar et al. ....... 370/310

OTHER PUBLICATIONS

Extended European search report for EP10774679.4 mailed on Aug. 16, 2012.

* cited by examiner

FIG. 2
| QoS CLASS | STREAM ID |
|---|---|
| EF | 1 |
| AF4 | 3,5 |
| AF3 | - |
| AF2 | 2 |
| AF1 | 4 |
| BE | STREAM ID IS NOT SPECIFIED |
FIG. 3A
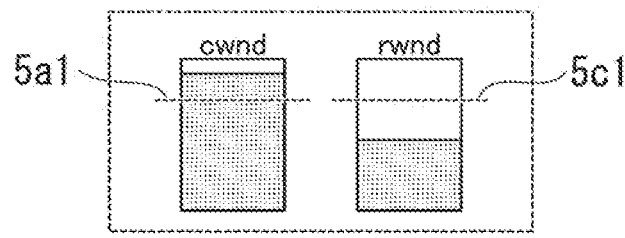
FIG. 3B
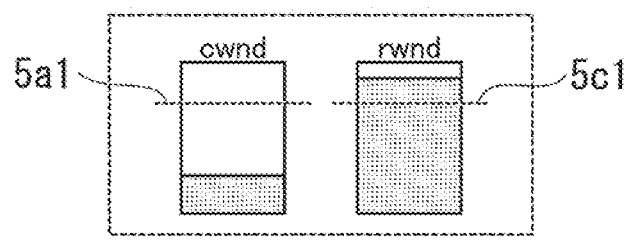

COMMUNICATION APPARATUS AND COMMUNICATION CONTROL METHOD

TECHNICAL FIELD

The present invention relates to a communication apparatus and a communication control method.

BACKGROUND ART

Patent Document 1 discloses a communication apparatus using a stream control transmission protocol (SCTP) defined by a request for comment (RFC) 4960.

In communication using the SCTP, an association corresponding to a connection with a transmission control protocol (TCP) is formed at the initiation of the communication. In the communication using the SCTP, unlike communication using the TCP, a plurality of streams can be established within one association. The respective streams within the one association are independent of each other, and all of the streams are scheduled under uniform conditions.

Moreover, in the communication using the SCTP, like communication using other transport protocols such as the TCP, when a network is determined to be congested, transmission data from a transmission source apparatus to a transmission destination apparatus is limited. In the communication using the SCTP, a congestion window cwnd and a receiver window rwnd are used to determine the congestion. It is to be noted that the congestion window cwnd is provided for every destination Internet protocol (IP) address, and the receiver window rwnd is provided for every transmission destination apparatus.

PRIOR ART DOCUMENT

Patent Document

Patent Document 1: Japanese Unexamined Patent. Application, First Publication No. 2006-101428

DISCLOSURE OF THE INVENTION

Problems to be Solved by the Invention

In the communication using the SCTP, if the network is determined to be congested based on the value of the congestion window cwnd corresponding to a certain destination IP address or the value of the receiver window rwnd corresponding to a transmission destination apparatus, the transmission of all streams within an association formed with the transmission destination apparatus to which the destination IP address is allocated are uniformly limited. That is, in the communication using the SCTP, since the congestion is determined by a congestion window cwnd for each destination IP address as indicated by a reference symbol A5 of FIG. 5, a high-priority stream for a user also becomes a target of congestion control like other streams. Moreover, as indicated by a reference symbol B5 of FIG. 5, if a receiver window rwnd of SCTP of a communication destination is congested, a high-priority stream for a user also becomes a target of congestion control like other streams.

Thus, for example, under a situation in which there are a high-priority stream and a low-priority stream, if the congestion occurs, the transmissions of the high-priority stream and the low-priority stream are equally limited.

That is, in the communication using the SCTP, the transmissions of the streams are uniformly limited when the network is determined to be congested despite the streams are independent of each other. Thus, there is a problem in that control for each stream, which is a merit of the SCTP, is not performed.

It is to be noted that this problem is common in communication apparatuses which can transmit a plurality of streams independently to a transmission destination apparatus and in which the transmissions of the streams are uniformly limited when a network is determined to be congested.

An exemplary object of the present invention is to provide a communication apparatus and a communication control method capable of solving the above-described problem.

Means for Solving the Problems

A communication apparatus of the present invention includes: a determination means that determines whether or not a congestion degree of communication with a communication destination apparatus has exceeded a predetermined determination value; and a communication control means that transmits a plurality of streams to the communication destination apparatus in parallel under a situation in which the congestion degree does not exceed the determination value, and thereafter interrupts at least a transmission of a stream having priority lower than other streams among the plurality of streams transmitted in parallel if the congestion degree exceeds the determination value, the priority of each stream being indicated by priority information.

A communication control method of the present invention determines whether or not a congestion degree of communication with a communication destination apparatus has exceeded a predetermined determination value; transmits a plurality of streams to the communication destination apparatus in parallel under a situation in which the congestion degree does not exceed the determination value; and thereafter interrupts at least a transmission of a stream having priority lower than other streams among the plurality of streams transmitted in parallel if the congestion degree exceeds the determination value, the priority of each stream being indicated by priority information.

Effects of the Invention

In accordance with the present invention, it is possible to transmit a high-priority stream and interrupt the transmission of a low-priority stream when a network is busy, and it is possible to control the transmissions of streams for each stream.

BRIEF DESCRIPTION OF THE DRAWINGS

FIG. 2 is a diagram showing an example of priority information in a storage unit 3 shown in FIG. 1.

FIG. 3A is a diagram illustrating a threshold and a reference value.

FIG. 3B is a diagram illustrating a threshold and a reference value.

MODE FOR CARRYING OUT THE INVENTION

Hereinafter, exemplary embodiments of the present invention will be described with reference to the drawings.

Figure 1:
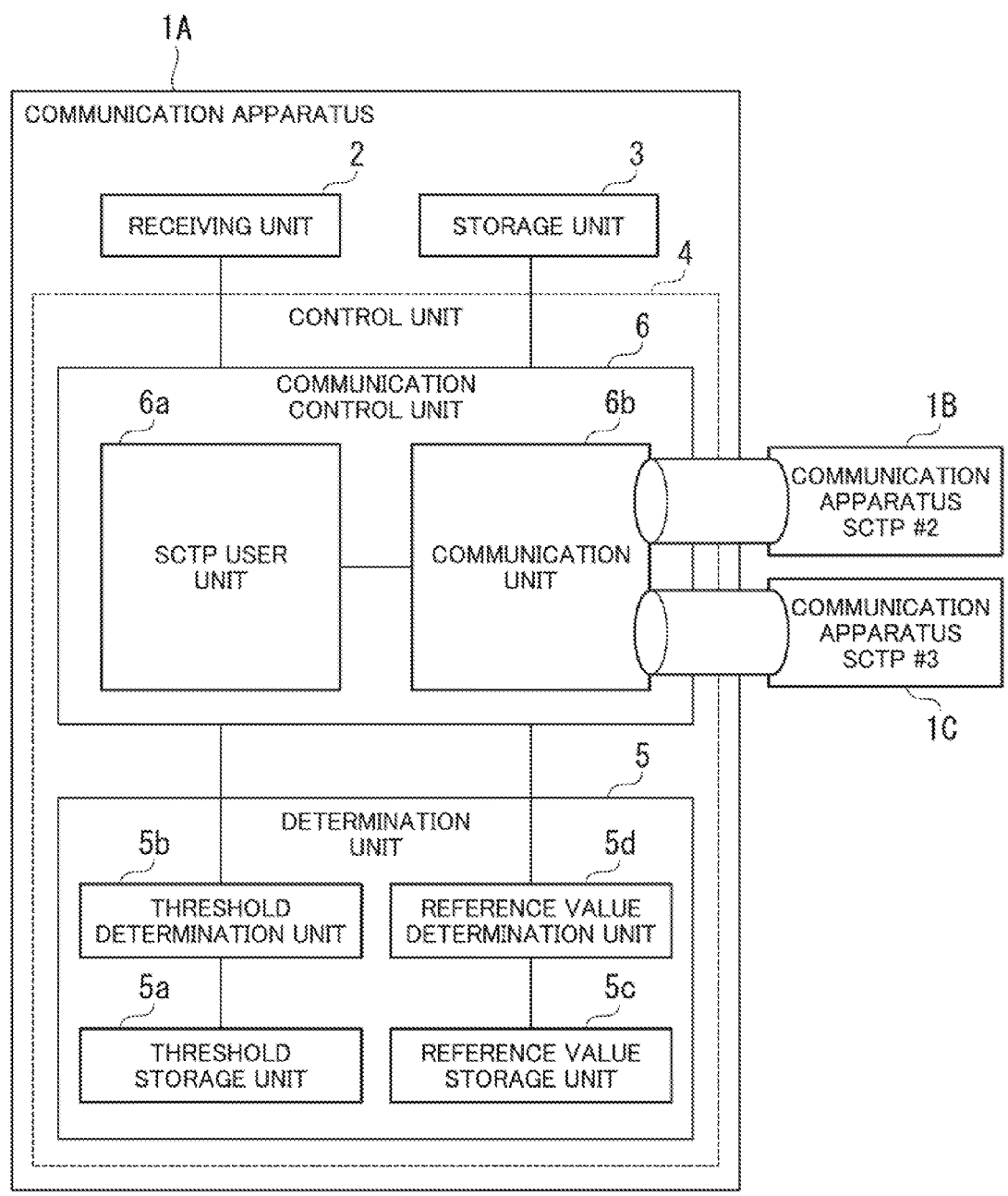
FIG. 1 is a block diagram showing the configuration of a communication apparatus 1A in accordance with an exemplary embodiment of the present invention.

FIG. 1 is a block diagram showing the configuration of a communication apparatus 1A in accordance with an exemplary embodiment of the present invention.

The communication apparatus 1A includes a receiving unit 2, a storage unit 3, and a control unit 4. The control unit 4 includes a determination unit 5 and a communication control unit 6. The determination unit 5 includes a threshold storage unit 5a, a threshold determination unit 5b, a reference value storage unit 5c, and a reference value determination unit 5d. The communication control unit 6 includes an SCTP user unit 6a and a communication unit 6b.

The communication apparatus 1A can transmit a plurality of streams to communication apparatuses 1B and 1C. The communication apparatus 1A uses SCTP as a protocol of a transport layer. The communication apparatus 1A may be, for example, a mobile communication apparatus (mobile station) such as a mobile phone, or a wireless base station apparatus. The communication apparatuses 1B and 1C are examples of communication destination apparatuses, and have, for example, the same function as the communication apparatus 1A.

In general, the receiving unit 2 can be referred to as a receiving means. The receiving unit 2 is, for example, input keys, and receives priority information indicating priority of each stream. It is to be noted that the priority information may indicate priority of a stream for each message in the stream.

In general, the storage unit 3 can be referred to as a storage means. The storage unit 3 stores the priority information received by the receiving unit 2.

FIG. 2 is a diagram showing an example of the priority information in the storage unit 3.

As shown in FIG. 2, the priority information includes a quality of service (QoS) class 3a and a stream ID 3b. The QoS class 3a indicates priority. In this exemplary embodiment, priorities become low in the order of EF, AF4, AF3, AF2, AF1, and BE. The stream ID 3b is identification information of a stream. In this exemplary embodiment, a number is used as the stream ID.

In FIG. 2, a QoS class (priority)=EF is assigned to a stream of a stream ID=1. A QoS class (priority)=AF4 is assigned to a stream of a stream ID=3 and a stream of a stream ID=5. A QoS class (priority)=AF3 is not assigned to any stream. A QoS class (priority)=AF2 is assigned to a stream of a stream ID=2. A QoS class (priority)=AF1 is assigned to a stream of a stream ID=4. A QoS class (priority)=BE is not assigned to any stream.

It is to be noted that the storage unit 3 may uniquely store the priority information shown in FIG. 2, and it may store the priority information for each opposed SCTP apparatus (communication destination apparatus).

Returning to FIG. 1, in general, the control unit 4 can be referred to as a control means.

The control unit 4 transmits a plurality of streams to a communication destination apparatus in parallel under a situation in which a degree of congestion of communication with the communication destination apparatus (hereinafter simply referred to as a "congestion degree") does not exceed a predetermined determination value (hereinafter simply referred to as a "determination value"). Thereafter, if the congestion degree exceeds the determination value, the control unit 4 interrupts at least the transmission of a stream having priority indicated by the priority information in the storage unit 3 that is lower than those of other streams among the plurality of streams transmitted in parallel.

It is to be noted that in this exemplary embodiment, the larger the value of the congestion window cwnd, the larger the congestion degree, or the smaller the value of the receiver window rwnd from the communication destination apparatus, the larger the congestion degree.

In this exemplary embodiment, the control unit 4 transmits streams by using the SCTP.

In this exemplary embodiment, a value smaller than the congestion degree by which the control unit 4 determines a communication state with the communication destination apparatus to be congestion in accordance with the SCTP is used as the determination value.

In general, the determination unit 5 can be referred to as a determination means. The determination unit 5 determines whether or not the congestion degree has exceeded the determination value.

The threshold storage unit 5a stores a threshold (determination value) for a comparison with the value of the congestion window cwnd. It is to be noted that in this exemplary embodiment, the smaller the congestion degree in communication with the communication destination apparatus, the smaller the value of the congestion window cwnd.

The threshold determination unit 5b determines whether or not the value of the congestion window cwnd generated by the control unit 4 in accordance with the SCTP has exceeded the threshold in the threshold storage unit 5a.

If the value of the congestion window cwnd does not exceed the threshold in the threshold storage unit 5a, the threshold determination unit 5b determines that the congestion degree does not exceed the determination value. On the other hand, if the value of the congestion window cwnd has exceeded the threshold in the threshold storage unit 5a, the threshold determination unit 5b determines that the congestion degree has exceeded the determination value. The threshold determination unit 5b provides a determination result to the communication unit 6b.

The reference value storage unit 5c stores a reference value (determination value) for a comparison with the value of the receiver window rwnd. It is to be noted that in this exemplary embodiment, the smaller the congestion degree in communication with the communication destination apparatus, the larger the value of the receiver window rwnd.

The reference value determination unit 5d determines whether or not the value of the receiver window rwnd received by the control unit 4 from the communication destination apparatus in accordance with the SCTP has exceeded the reference value in the reference value storage unit 5c.

If the value of the receiver window rwnd has exceeded the reference value in the reference value storage unit 5c, the reference value determination unit 5d determines that the congestion degree does not exceed the determination value. On the other hand, if the value of the receiver window rwnd becomes a value that does not exceed the reference value in the reference value storage unit 5c, the reference value determination unit 5d determines that the congestion degree has exceeded the determination value. The reference value determination unit 5d provides a determination result to the communication unit 6b.

In general, the communication control unit 6 can be referred to as a communication control means. The communication control unit 6 transmits a plurality of streams to the communication destination apparatus in parallel under a situation in which the determination unit 5 determines that the congestion degree does not exceed the determination value. On the other hand, if the determination unit 5 determines that the congestion degree has exceeded the determination value, the communication control unit 6 interrupts at least the transmission of a stream having priority indicated by the priority information in the storage unit 3 that is lower than those of other streams under a situation in which the priority information in the storage unit 3 indicates that there are a plurality of streams having different priorities.

For example, if the determination unit 5 determines that the congestion degree has exceeded the determination value under a situation in which the priority information shown in FIG. 2 is stored in the storage unit 3, the communication control unit 6 interrupts the transmission of a stream of a stream ID=4 and continues transmitting other streams.

It is to be noted that if the determination unit 5 determines that the congestion degree has exceeded the determination value under a situation in which the priority information shown in FIG. 2 is stored in the storage unit 3, the communication control unit 6 may interrupt the transmission of the stream of the stream ID=4, interrupt the transmission of a stream of a stream ID=2 having the next lowest priority to the stream of the stream ID=4, and continue transmitting other streams.

Moreover, if the determination unit 5 determines that the congestion degree has exceeded the determination value under a situation in which the priority information shown in FIG. 2 is stored in the storage unit 3, the communication control unit 6 may interrupt the transmission of the stream of the stream ID=4, interrupt the transmission of the stream of the stream ID=2 having the next lowest priority to the stream of the stream ID=4 and the transmissions of streams of stream IDs=3 and 5 having the lowest priorities to the stream of the stream ID=2, and continue transmitting other streams.

As described above, if the determination unit 5 determines that the congestion degree has exceeded the determination value, the communication control unit 6 continues transmitting a stream having highest priority, and interrupts at least the transmission of a stream having lowest priority among streams other than the stream having the highest priority.

Even when the determination unit 5 determines that the congestion degree has exceeded the determination value, if the priority information in the storage unit 3 indicates that all the streams have the same priority, the communication control unit 6 transmits a plurality of streams to the communication destination apparatus in parallel as in the case in which the congestion degree does not exceed the determination value.

The SCTP user unit 6a provides the communication unit 6b with a transmission request for transmitting a plurality of streams.

If the determination result of the determination unit 5 indicates that the congestion degree does not exceed the determination value under a situation in which the transmission request has been received from the SCTP user unit 6a, the communication unit 6b transmits the plurality of streams to the communication destination apparatus in parallel.

In this exemplary embodiment, if both the determination result of the threshold determination unit 5b and the determination result of the reference value determination unit 5d indicate that the congestion degree does not exceed the determination value under the situation in which the transmission request has been received from the SCTP user unit 6a, the communication unit 6b determines that the congestion degree does not exceed the determination value and transmits the plurality of streams to the communication destination apparatus in parallel.

On the other hand, if the determination result of the determination unit 5 indicates that the congestion degree has exceeded the determination value under the situation in which the transmission request has been received from the SCTP user unit 6a, the communication unit 6b interrupts at least the transmission of a stream having priority indicated by the priority information in the storage unit 3 that is lower than those of other streams.

In this exemplary embodiment, if either the determination result of the threshold determination unit 5b or the determination result of the reference value determination unit 5d, or both thereof indicate that the congestion degree has exceeded the determination value under the situation in which the transmission request has been received from the SCTP user unit 6a, the communication unit 6b determines that the congestion degree has exceeded the determination value and interrupts at least the transmission of a stream having priority indicated by the priority information in the storage unit 3 that is lower than those of other streams.

Next, an operation of this exemplary embodiment will be described.

First, an operation of determining whether or not the congestion state has occurred will be described.

FIGS. 3A and 3B are diagrams illustrating a relationship between the threshold in the threshold storage unit 5a and the congestion window cwnd and a relationship between the reference value in the reference value storage unit 5c and the receiver window rwnd.

As shown in FIGS. 3A and 3B, a threshold 5a1 and a reference value 5c1 are provided.

The control unit 4 periodically reads the value of the congestion window cwnd and the value of the receiver window rwnd of an opposed SCTP communication apparatus (communication destination apparatus), which can be obtained by communication using the SCTP.

If the value of the congestion window cwnd has exceeded the threshold 5a1 or if the value of the receiver window rwnd is less than or equal to the reference value 5c1, the control unit 4 determines that the congestion degree has exceeded the determination value.

On the other hand, if the value of the congestion window cwnd does not exceed the threshold 5a1 and the value of the receiver window rwnd exceeds the reference value 5c1, the control unit 4 determines that the congestion degree does not exceed the determination value.

It is to be noted that the control unit 4 also performs a general congestion determination to be performed in communication using the SCTP. For example, if a response (Ack) of an SCTP signal cannot be received or if a signal is lost, the control unit 4 determines that the congestion has occurred.

Subsequently, an operation of controlling streams to be transmitted depending on whether or not the congestion degree has exceeded the determination value will be described.

Figure 4:
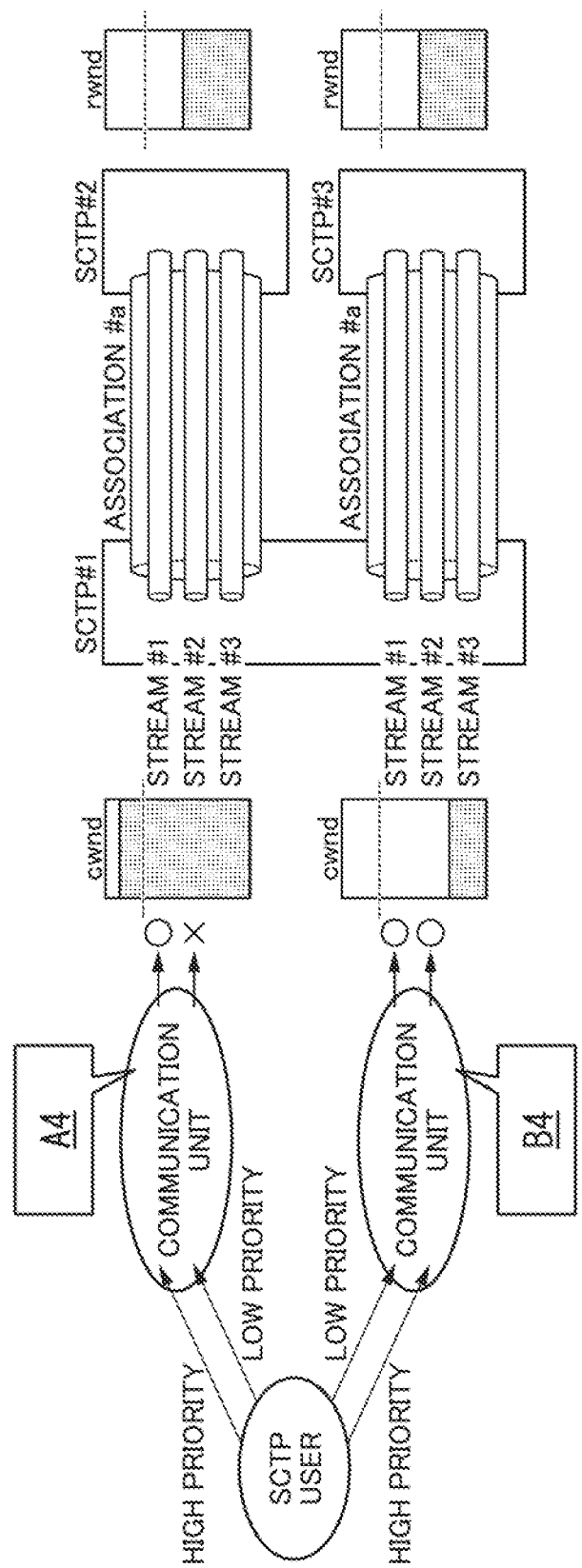
FIG. 4 is a diagram illustrating an operation of controlling streams to be transmitted.
Figure 5:
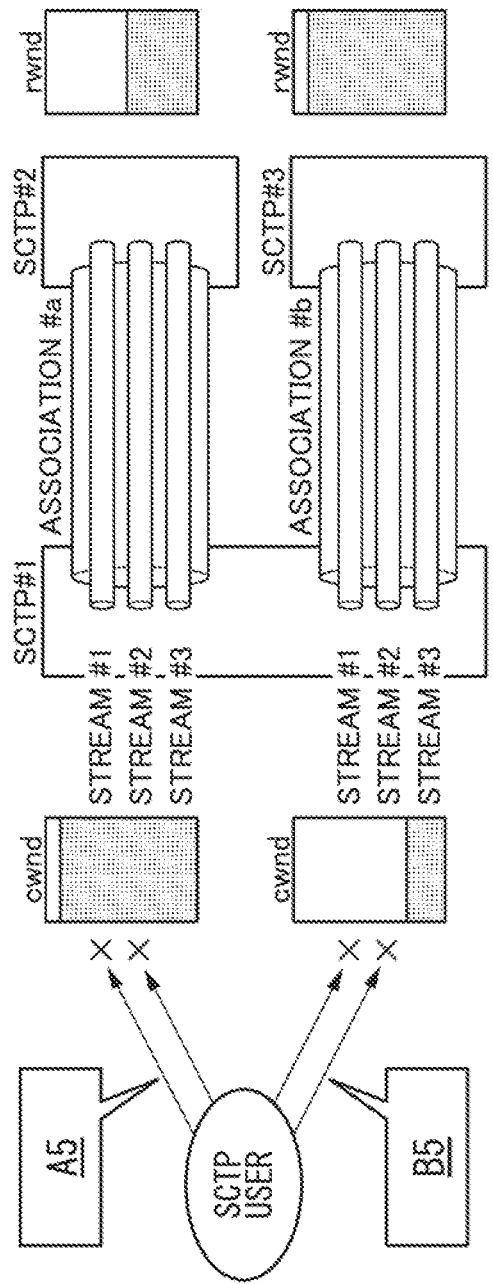
FIG. 5 is a diagram illustrating an example in which the transmissions of all streams within an association are uniformly limited when congestion has occurred.

FIG. 4 is a diagram illustrating an operation of controlling streams to be transmitted. In FIG. 4, in the case indicated by a reference symbol A4, the congestion window cwnd of SCTP #2 (the communication apparatus 1B) is determined to be in the congestion state, and only a signal transmission request of a high-priority SCTP message is received. Moreover, in FIG. 4, in the case indicated by a reference symbol B4, all SCTP signal transmission requests are received because both the congestion window cwnd and the receiver window rwnd of SCTP #2 (the communication apparatus 1B) are in a normal state.

The control unit 4 controls streams to be transmitted based on a determination result of whether or not the congestion degree has exceeded the determination value and the priority information in the storage unit 3.

The control unit 4 distinguishes a high-priority stream (SCTP message) and a low-priority stream (SCTP message) by referring to the priority information in the storage unit 3.

For a line of which congestion degree does not exceed the determination value, the control unit 4 uniformly schedules and transmits a plurality of streams (SCTP messages) in parallel regardless of priority.

For a line of which congestion degree has exceeded the determination value (that is, a line for which there is a high possibility that congestion occurs), for example, the control unit 4 interrupts the transmission of a stream having lower priority than other streams as indicated by the priority information in the storage unit 3 based on the priority information in the storage unit 3, and transmits the other streams.

It is to be noted that if the priority information in the storage unit 3 indicates priority of each stream for each message in each stream, the control unit 4 may, for example, dynamically change a correspondence relationship between the QoS class 3a and the stream ID 3b in the storage unit 3, every time a message to be transmitted is changed.

In accordance with this exemplary embodiment, the control unit 4 transmits a plurality of streams to the communication destination apparatus in parallel under a situation in which the congestion degree does not exceed the determination value. Thereafter, if the congestion degree exceeds the determination value, the control unit 4 interrupts at least the transmission of a stream having priority indicated by the priority information in the storage unit 3 that is lower than those of other streams among the plurality of streams being transmitted in parallel.

Thus, when the network is busy, it is possible to transmit a high-priority stream and interrupt the transmission of a low-priority stream, and it is possible to preferentially transmit important data. It is also possible to control the transmissions of streams for each stream.

It is also possible to control the transmission of an SCTP message for each stream ID without modifying a congestion control function (a congestion window cwnd, a receiver window rwnd, and a limitation on the transmission during congestion) of the SCTP defined by RFC.

If priority information indicating priority of each stream for each message in each stream is used, transmission control of streams can be performed for each message.

In this exemplary embodiment, the control unit 4 transmits streams by using the SCTP, and uses a value smaller than the congestion degree by which the control unit 4 determines a communication state with the communication destination apparatus to be congestion in accordance with the SCTP as the determination value.

In this case, before the control unit 4 using the SCTP determines that congestion has occurred in accordance with the SCTP and limits the number of signals to be transmitted to a network, the control unit 4 can recognize that the congestion (or a congestion state) is nearing.

Thereby, it is possible to decrease the load of the network and schedule a stream or message to be preferentially transmitted before the control unit 4 using the SCTP actually detects the congestion.

In this exemplary embodiment, the larger the value of the congestion window, the larger the congestion degree, or the smaller the value of the receiver window from the communication destination apparatus, the larger the congestion degree. Thus, the congestion degree can be based on the congestion window or the receiver window.

It is to be noted that a function of the control unit 4 may be implemented in a higher layer of the SCTP or it may be implemented to be embedded in the SCTP itself.

Moreover, the SCTP may further divide the congestion window cwnd managed for each IP address and the receiver window rwnd of the communication destination SCTP and manage them (for example, for each association or for each stream), so that more detailed control is possible in the congestion control function of this exemplary embodiment.

Moreover, the communication apparatus 1A may be implemented using dedicated hardware. Alternatively, the communication apparatus 1A may be implemented using a computer system that executes a program for implementing functions of the receiving unit 2, the storage unit 3, and the control unit 4. The computer system functions as the receiving unit 2, the storage unit 3, and the control unit 4 by reading and executing the above-described program recorded in a computer-readable recording medium.

The computer-readable recording medium is a recording medium such as a flexible disk, a magneto-optical disc, or a compact disc-read only memory (CD-ROM), or a storage apparatus such as a hard disk apparatus embedded in a computer system.

While the present invention has been particularly shown and described with reference to exemplary embodiments thereof, the present invention is not limited to these exemplary embodiments. It will be understood by those of ordinary skill in the art that various changes in form and details may be made therein without departing from the spirit and scope of the present invention as defined in the claims.

This application is based upon and claims the benefit of priority from Japanese Patent Application No. 2009-114576, filed May 11, 2009; the disclosure of which is incorporated herein in its entirety by reference.

INDUSTRIAL APPLICABILITY

The present invention can be used, for example, in a communication apparatus capable of transmitting a plurality of streams. In accordance with the present invention, when a network is busy, it is possible to transmit a high-priority stream and interrupt the transmission of a low-priority stream. As a result, it is possible to control the transmission of the streams for each stream.

DESCRIPTION OF REFERENCE SYMBOLS

1A-1C: Communication apparatus
2: Receiving unit
3: Storage unit
4: Control unit
5: Determination unit
5a: Threshold storage unit
5b: Threshold determination unit
5c: Reference value storage unit
5d: Reference value determination unit
6: Communication control unit
6a: SCTP user unit
6b: Communication unit

The invention claimed is:
1. A communication apparatus comprising:
a determination means that determines whether or not a congestion degree of communication with a communication destination apparatus has exceeded a predetermined determination value based on a threshold for a comparison with the value of a congestion window obtained by communication using a stream control transmission protocol (SCTP) which is a protocol of a transport layer, and a reference value for a comparison with the value of a receiver window corresponding to the communication destination apparatus obtained by the communication using the SCTP; and a communication control means that transmits a plurality of streams which are established within an association which is formed between the communication apparatus and the communication destination apparatus in the communication using the SCTP to the communication destination apparatus in parallel under a situation in which the congestion degree does not exceed the determination value, and thereafter interrupts at least a transmission of a stream having priority lower than other streams among the plurality of streams transmitted in parallel if the congestion degree exceeds the determination value, the priority of each stream being indicated by priority information, wherein the communication control means transmits the streams by using the SCTP, and the predetermined determination value is smaller than a congestion degree with which the communication control means makes a determination in accordance with the SCTP as to whether or not a communication between the communication apparatus and the communication destination apparatus is being congested.

2. The communication apparatus according to claim 1, wherein the priority information indicates the priority of each stream for each message in each stream.

3. The communication apparatus according to claim 2, wherein the communication control means dynamically changes a correspondence relationship between the priority information and a message to be transmitted every time the message is changed.

4. The communication apparatus according to claim 1, wherein the larger the value of the congestion window, the larger the congestion degree, or the smaller the value of the receiver window from the communication destination apparatus, the larger the congestion degree.

5. The communication apparatus according to claim 4, wherein the communication control means determines that the congestion degree has exceeded the determination value if the value of the congestion window exceeds the threshold and the value of the receiver window does not exceed the reference value.

6. The communication apparatus according to claim 1, comprising:
 a receiving means that receives the priority information; and
 a storage means that stores the priority information received by the receiving means.

7. The communication apparatus according to claim 1, wherein, if the congestion degree has exceeded the determination value, the communication control means continues transmitting a stream having highest priority among the plurality of streams transmitted in parallel, and interrupts at least a transmission of a stream having lowest priority among streams other than the stream having the highest priority.

8. The communication apparatus according to claim 1, wherein, if all the streams have the same priority, the communication control means transmits the plurality of streams to the communication destination apparatus in parallel even when the congestion degree has exceeded the determination value.

9. A communication control method comprising:
 determining whether or not a congestion degree of communication with a communication destination apparatus has exceeded a predetermined determination value based on a threshold for a comparison with the value of a congestion window obtained by communication using a stream control transmission protocol (SCTP) which is a protocol of a transport layer, and a reference value for a comparison with the value of a receiver window corresponding to the communication destination apparatus obtained by the communication using the SCTP;
 transmitting a plurality of streams which are established within an association which is formed between a communication apparatus and the communication destination apparatus in the communication using the SCTP to the communication destination apparatus in parallel under a situation in which the congestion degree does not exceed the determination value; and
 thereafter interrupting at least a transmission of a stream having priority lower than other streams among the plurality of streams transmitted in parallel if the congestion degree exceeds the determination value, the priority of each stream being indicated by priority information,
 wherein the streams are transmitted by using the SCTP, and
 the predetermined determination value is smaller than a congestion degree with which a determination in accordance with the SCTP as to whether or not a communication between the communication apparatus and the communication destination apparatus is being congested is made.

* * * * *